W. A. FREDERICK.
SUPPLEMENTAL TIRE HOLDER.
APPLICATION FILED MAR. 15, 1915.
1,192,816.
Patented July 25, 1916.
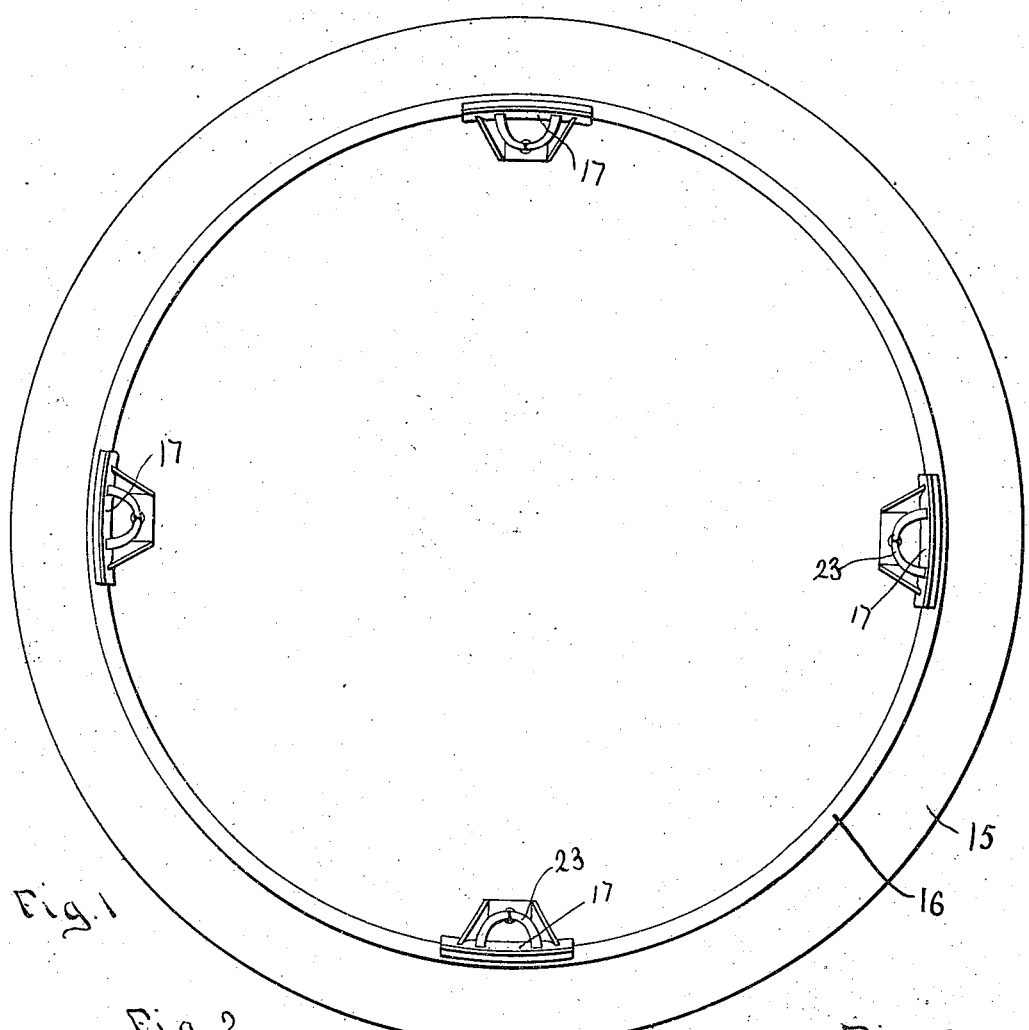
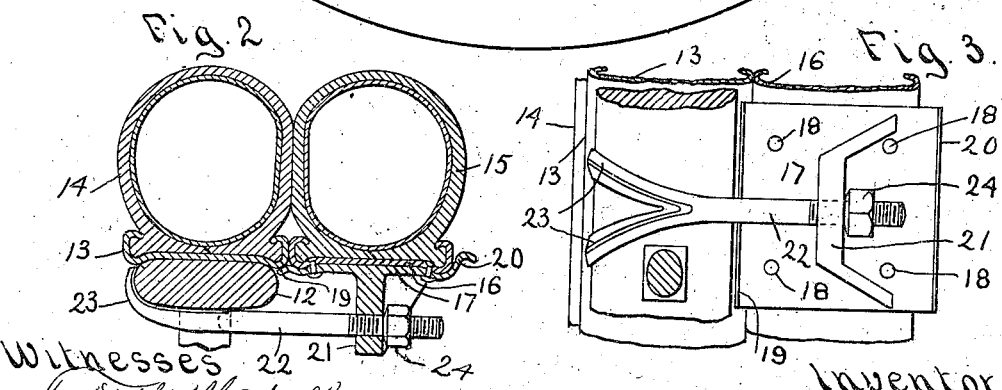
Witnesses
Fred W. McArdle
J. Leow O'Neil
Inventor
William A. Frederick
by A. W. Harrison
Att'y

UNITED STATES PATENT OFFICE.

WILLIAM A. FREDERICK, OF BOSTON, MASSACHUSETTS, ASSIGNOR TO TWIN-RIM COMPANY, OF BOSTON, MASSACHUSETTS, A CORPORATION OF MASSACHUSETTS.

SUPPLEMENTAL-TIRE HOLDER.

1,192,816.   Specification of Letters Patent.   Patented July 25, 1916.

Application filed March 15, 1915. Serial No. 14,544.

*To all whom it may concern:*

Be it known that I, WILLIAM A. FREDERICK, of Boston, in the county of Suffolk and State of Massachusetts, have invented certain new and useful Improvements in Supplemental-Tire Holders, of which the following is a specification.

This invention relates to wheels and tires especially designed for automobiles.

Heavy machines such as automobile trucks frequently have double or "dual" tires on the wheels, especially the rear wheels, so that they may have a wide tread. Frequently it is desirable to provide touring cars with wide treads as hereinafter explained. When one tire has become disabled, as by being punctured, it usually takes considerable time to either make repairs or to substitute a new tire for the disabled one.

The object of my invention is to provide a supplemental tire structure at low cost and easy applicability to position, for use either when an emergency requires it (such as when a tire has been punctured) or when an extra support is needed. To this end I have provided a supplemental tire and rim which is no more cumbersome to carry on an automobile than an ordinary demountable rim and tire, my improved supplemental tire being capable of being mounted alongside of either an injured or an uninjured tire.

My invention consists in means whereby a supplemental tire can be secured alongside of an existing tire, without requiring any additional hub or spoke construction other than that included in the wheel to which the supplemental tire is attached.

Of the accompanying drawings, Figure 1 is a side elevation of a tire and rim of "clencher" type, having the clamp members connected thereto all ready to be attached to a complete wheel. Fig. 2 represents a section, on a larger scale, representing my supplemental tire connected alongside of an uninjured tire, making a double or "dual" tire. Fig. 3 is a view from the under side of Fig. 2.

Similar reference characters indicate similar parts in all of the views.

The felly of an ordinary or usual supporting wheel is indicated at 12 in Figs. 2 and 3, said felly having a rim 13 supporting a tire 14. The rim 13 and tire 14 are represented as of the "clencher" type. It is to be understood, however, that the felly, rim and tire so far described may be of any type or character.

My supplemental device or attachment comprises a tire 15 connected in the usual manner to a rim 16, similar to the rim 13. Secured to the inner surface of the rim 16 at a plurality of points (3, 4 or more) are plates 17 which are, of course, curved from end to end to fit the internal curvature of the rim 16. Each plate is secured to the rim by suitable means as by rivets 18. The edges 19, 20 of each plate are turned up or curved so that one edge or the other may fit snugly against the inner surface of the rim 13. The plates 17 are wider than the rim 16 to project beyond the sides of the latter to engage the inner surface of rim 13. The edge 20 is turned up or curved higher than the edge 19, the object of this being to enable the supplemental tire and rim to be connected to different sized rims 13, by simply attaching the supplemental tire and rim with one side or the other against the supporting wheel. Each plate is provided at its mid-width with a lug 21 having an aperture for the shank 22 of a clamp device having a bifurcated hooked end 23 to engage the far side of the felly of a supporting wheel. By means of a nut 24 on the threaded end of the shank 22, said nut preferably having a convexed end to bear against the lug 21, the complete rim and tire can be quickly clamped against the side of the rim and tire of the supporting wheel of the automobile, the two rims 13, 16, bearing directly against each other and the curved edges of the several plates 17 fitting snugly inside the rim 13, the bifurcated hooked ends 23 of the several shanks extending between the spokes of the supporting wheel and engaging the far side of the felly 12.

The felly 12 and rim 13, as a whole, constitutes the rim portion of the supporting wheel of an automobile, as distinguished from any hub or spoke structure. The supplemental rim and tire has no hub or spoke structure, said supplemental tire and rim being supported by the hub and spokes of the original supporting wheel. It will be understood that by this structure I avoid having the supplemental tire provided with any portion which extends materially into the area within the rim. The attachment is therefore not noticeably different from an ordinary demountable rim and tire and can, therefore, be carried on an automobile practically the same as the present well-known demountable rim and tire.

Each plate 17 and its lug 21 practically constitutes a bracket to which the shank of the clamp is adjustably connected. The structure of the plates with the edges 19 and 20 turned up or bent, enables the supplemental wheel and rim to be applied to different sizes, diametrically, of rims 13, by simply reversing the supplemental rim or tire as hereinbefore described. Owing to the lugs 21 being at the mid-width of the plates 17, this reversal can be readily effected without making any structural change, the hooked clamps serving equally as well whether the edges 19 or the edges 20 are bearing against the rim 13.

If the user of a car supplied with two of my improved attachments is making a somewhat long journey and reaches road conditions where single tires on the rear wheels are not sufficient for comfort, or to support the weight on a rough road, he can simply apply the two attachments to the two rear wheels. When any one tire becomes disabled, it is not necessary to stop for repairs or any longer than necessary to simply clamp one of my improved supplemental devices to the side of the wheel the tire of which has become disabled.

Owing to the fact that the plates are independent of each other and that each occupies but a short space around the interior of the rim 16, as shown in Fig. 1, the projecting edges 19, 20 present lips that are capable of yielding somewhat, when the nuts 24 are set up tight. The rims 13 of stock wheels are not of exactly the same diameter, even when intended to be so made. The fact that the lips 19, 20 can give or yield slightly enables my improved supplemental rim to be tightly secured closely alongside of a rim 13 which would be too small to permit this to be done if the lips were continuous in the form of a ring because a metal ring can not be reduced in diameter without buckling unless entirely re-rolled or otherwise mechanically re-formed.

A further advantage of having the series of lips 20 so shaped as to present arcs of a circle larger than that of which the lips 19 form arcs is that if the rim of a supporting wheel to which my improvement is to be attached is of such diameter that the lips 20 could not be made to yield or give sufficiently to enable the two rims 16 and 13 to be forced close together by the clamp devices, then the supplemental member can be turned so as to present the smaller series of lips 19 to the supporting-wheel rim.

Having now described my invention what I claim is:

A supplemental rim and tire adapted to be connected to either one of a plurality of sizes of vehicle-supporting wheels, said supplemental rim having a plurality of plates rigidly secured to it in spaced relationship, each of said plates having its opposite edges bent and provided with lips having beveled outer faces projecting beyond the sides of the rim to form a series of spaced lips at each side of the rim to engage the internal or concave surface of the rim of a supporting wheel, the series of lips at one side forming arcs of a larger circle than those at the other side, and means for clamping the supplemental rim closely to the side of the rim of the supporting wheel with no intervening spaces between said rims.

In testimony whereof I have affixed my signature, in presence of two witnesses.

WILLIAM A. FREDERICK.

Witnesses:
A. W. HARRISON,
FRANKLIN P. DALY.